No. 700,489. Patented May 20, 1902.
D. H. HAYWOOD.
VEHICLE WHEEL.
(Application filed Mar. 7, 1902.)
(No Model.)
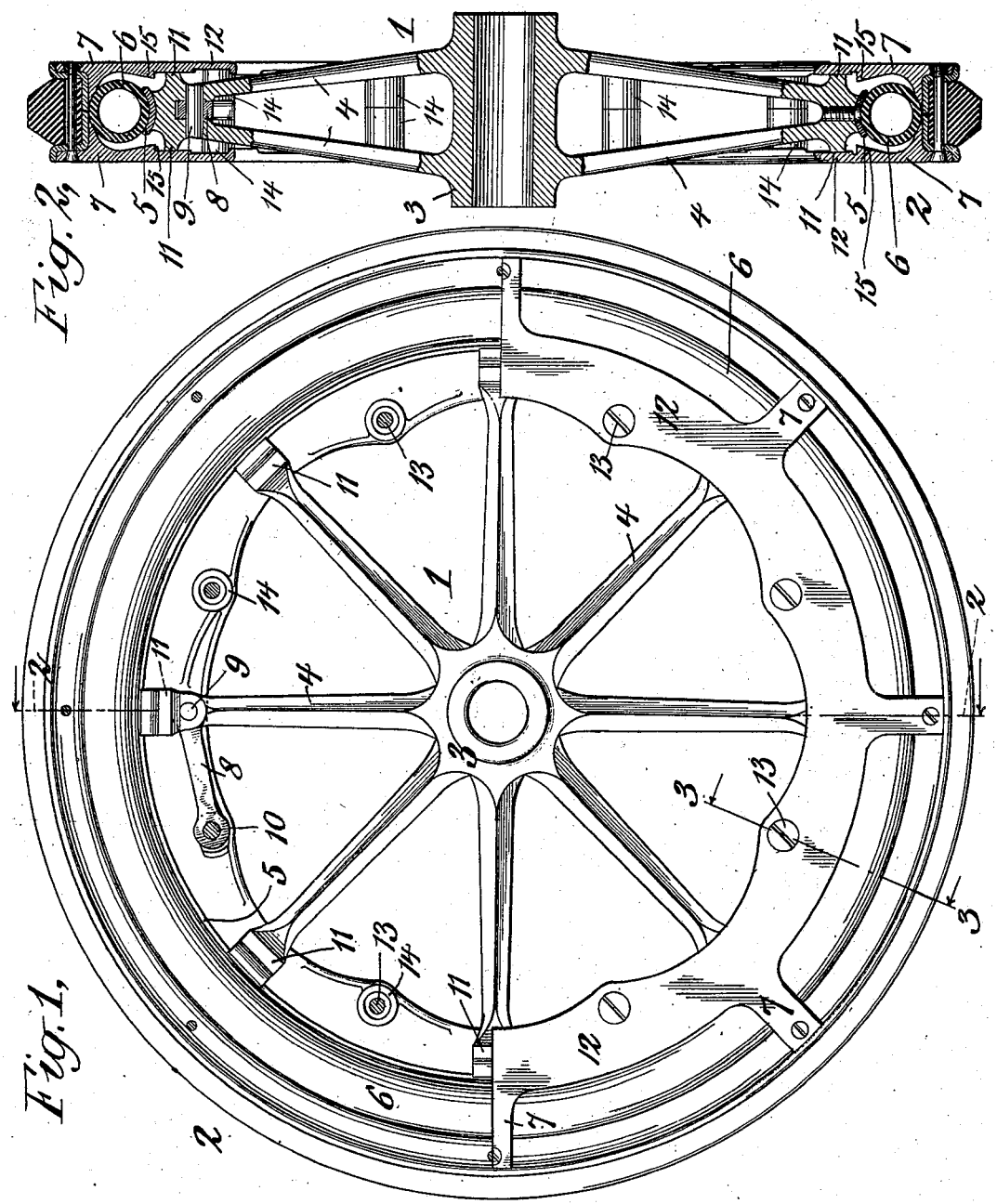
WITNESSES:
INVENTOR
D. Howard Haywood
BY
Chapin Haywood Marble
his ATTORNEYS
THE NORRIS PETERS CO., PHOTO-LITHO., WASHINGTON, D. C.

UNITED STATES PATENT OFFICE.

DANIEL HOWARD HAYWOOD, OF NEW YORK, N. Y.

VEHICLE-WHEEL.

SPECIFICATION forming part of Letters Patent No. 700,489, dated May 20, 1902.

Application filed March 7, 1902. Serial No. 97,118. (No model.)

*To all whom it may concern:*

Be it known that I, DANIEL HOWARD HAYWOOD, a citizen of the United States of America, residing at New York, county and State of New York, have invented certain new and useful Improvements in Vehicle-Wheels, of which the following is a specification, reference being had to the accompanying drawings, forming a part thereof.

My invention relates to cushioned wheels, and particularly to that class of cushioned wheels in which the cushioning means is arranged intermediate of the hub and tread portions of the wheel.

My invention consists in the new and improved mechanism and in the construction and combination of parts hereinafter set forth.

The main object of my invention is to simplify the construction of a wheel of this class, to reduce the weight while increasing the strength and rigidity of same, and to lessen the cost of manufacture.

I will now proceed to describe a vehicle-wheel embodying my invention, and will then point out the novel features in claims.

In the drawings, Figure 1 is a view in side elevation of a wheel embodying my invention, certain parts being broken away and other parts removed in order to better illustrate the invention. Fig. 2 is a view in transverse sectional elevation of the same, the plane of section being taken upon the line 2 2 of Fig. 1. Fig. 3 is a detail sectional view, the plane of section being taken upon the line 3 3 of Fig. 1.

The wheel is of that class which comprises two members, one including the hub and which is termed the "hub member," and the other the tread or outer tire and which is termed the "tire member." In the drawings the hub member is designated as a whole by the reference character 1 and the tire member as a whole by the reference character 2. The hub member 1 comprises a hub 3, spokes 4, and a rim 5. A cushioning device 6 is arranged between the rim 5 and the tire member 2. The cushioning device herein consists of a flexible inflatable tube.

The tire member 2 is provided with inwardly-projecting guides 7, which surround the cushioning device and by lateral engagement with the hub member resist lateral movement of the two members with respect to each other. I connect the two members together by a single connection upon one side only of the center of the wheel members, and preferably do so by employing a link 8, which is pivotally connected at 9 to the hub member 1 and at 10 to the tire member 2. Such connection will connect the members rotatively together, but will permit such a movement of the hub member 1 with respect to the tire member 2 as is necessary to utilize the resilience of the cushioning device 6. This will be readily understood by reference to Fig. 1 of the drawings.

The inwardly-projecting guides 7 are arranged on either side of the spokes 4, and the spokes 4 have laterally-extending ears 11, adapted to engage the inner faces of the said guides 7. The guides 7 are preferably connected by a continuous ring 12, so that the guides 7 and rings 12 form integral spiders. This construction gives great strength and rigidity and produces a symmetrical-looking wheel. There are two such spiders provided, one upon each side of the cushioning device 6. They are connected together by bolts 13 and spaced apart by spacing-pieces or thimbles 14.

The spacing-pieces 14 are preferably provided as laterally-projecting integral portions of the spiders or guide-plates and are arranged, as shown, the one with a socket and the other with a projection interlocking therewith to insure rigidity between the said spiders or guide-plates.

In order to limit the radial movement of one member with respect to the other, and especially to provide for preventing a too extended relative movement of the members should the flexible inflatable tube forming the cushioning device collapse, I have provided the spiders or guide-plates with laterally-projecting portions 15, arranged in the path of movement of the said ears 11 and adapted to engage the radial edges of the said ears upon such abnormal relative movement. The said link 8 may conveniently be connected to one of the spokes at 9, and at the other end may be connected to one of the connecting-bolts 13. The link in this manner is practically concealed from view and protected from injury.

The link 8 comprises a draft-transmitting connection which is entirely independent of the cushioning device, but which when power is applied to the hub member to rotate the wheel will permit draft shocks to be cushioned by the said cushioning device 6. A sudden application of power upon the hub member would have a tendency to rock the same upon the pivotal connection 9 of the hub member with the link, and such movement being resisted by the cushioning device draft shocks would be cushioned thereby.

It will of course be understood that I do not desire to limit myself to the precise details of construction and combination of parts as herein shown and described, as the same may obviously be varied within wide limits without departing from the spirit and scope of my invention.

What I claim is—

1. In a wheel, the combination with a hub member comprising a hub, spokes and a rim, the spokes provided at substantially their outer ends with laterally-projecting ears forming bearing-faces, of a cushioning device, comprising a resilient ring, engaged by the outer face of said rim, a tire member comprising a tire-rim, the inner periphery of which directly engages the said resilient ring, and guide-plates secured to the said tire-rim and projecting inwardly over the said resilient ring and hub-rim, and engaging the laterally-projecting ears or bearing-faces of said spokes; and a connection between one of the said spokes only and the said tire member.

2. In a wheel, the combination with a hub member comprising a hub, spokes and a rim, the spokes provided at substantially their outer ends with laterally-projecting ears forming bearing-faces, of a cushioning device, comprising a resilient ring, engaged by the outer face of said rim, a tire member comprising a tire-rim, the inner periphery of which directly engages the said resilient ring, and guide-plates secured to the said tire-rim and projecting inwardly over the said resilient ring and hub-rim, and engaging the laterally-projecting ears or bearing-faces of said spokes; and a link connecting the said members together, substantially as set forth.

3. In a wheel, the combination with a tire member comprising a tire-rim, and a tire supported directly thereby upon its outer periphery, of a cushioning device, comprising a resilient ring, supported directly against the inner periphery of the said tire-rim, an independent hub member comprising a hub, spokes and a rim, the said rim engaging, at its outer periphery, the said cushioning device; and a connection at one point only, between the said members, connecting the said members rotatively together.

4. In a wheel, the combination with a tire member comprising a tire-rim, and a tire supported directly thereby upon its outer periphery, of a cushioning device, comprising a resilient ring, supported directly against the inner periphery of said tire-rim, an independent hub member comprising a hub, spokes and a rim, the said rim engaging, at its outer periphery, the said cushioning device; and a link connecting the said members together, substantially as set forth.

5. In a wheel, the combination with a tire member comprising a tire-rim, and a tire supported directly thereby upon its outer periphery, of a cushioning device, supported directly against the inner periphery of said tire-rim, an independent hub member comprising a hub, spokes and a rim, the said rim engaging, at its outer periphery, the said cushioning device; and a link connecting the said members together, substantially as set forth.

6. In a wheel, the combination with a hub member comprising a hub, spokes and a rim, of a cushioning device, comprising a resilient ring, engaged by the outer face of said rim, a tire member comprising a tire-rim, the inner periphery of which directly engages the said resilient ring, guide-plates secured to the said tire-rim and extending inwardly over the said resilient ring and hub-rim, and bolts, arranged within the hub-rim and between the said spokes, for securing the inner ends of the said guide-plates together; and a connection between one of the spokes only and the said tire member.

7. In a wheel, the combination with a hub member comprising a hub, spokes and a rim, of a cushioning device, comprising a resilient ring, engaged by the outer face of said rim, a tire member comprising a tire-rim, the inner periphery of which directly engages the said resilient ring, guide-plates secured to the said tire-rim and extending inwardly over the said resilient ring and hub-rim, and bolts, arranged within the hub-rim and between the said spokes, for securing the inner ends of the said guide-plates together; and a link connecting the said members together, substantially as set forth.

8. In a wheel, the combination with a hub member comprising a hub, spokes and a rim, of a cushioning device, comprising a resilient ring, engaged by the outer face of said rim, a tire member comprising a tire-rim, the inner periphery of which directly engages the said resilient ring, guide-plates secured to the said tire-rim and extending inwardly over the said resilient ring and hub-rim, and bolts, arranged within the hub-rim and between the said spokes, for securing the inner ends of the said guide-plates together; and a link pivotally connected at one end to one of said spokes and at the other end to one of the said guide-plates securing-bolts, substantially as specified.

9. In a wheel, the combination with a hub member comprising a hub, spokes and a rim, of a cushioning device, comprising a resilient ring, engaged by the outer face of said rim, a tire member comprising a tire-rim, the inner periphery of which directly engages the said resilient ring, guide-plates, consisting each of a plurality of arms 7 secured to the said tire-rim, and a continuous ring 12 connected to said arms, the inner diameter of said rings 12 being less than the inner diameter of the said hub-rim, and bolts, arranged within the hub-rim and between the said spokes, for securing the said guide-plates together; and a connection between one of the spokes only and the said guide-plates.

10. In a wheel, the combination with a hub member comprising a hub, spokes and a rim, of a cushioning device, comprising a resilient ring, engaged by the outer face of said rim, a tire member comprising a tire-rim, the inner periphery of which directly engages the said resilient ring, guide-plates, consisting each of a plurality of arms 7 secured to the said tire-rim, and a continuous ring 12 connected to said arms, the inner diameter of said rings 12 being less than the inner diameter of the said hub-rim, and bolts, arranged within the hub-rim and between the said spokes, for securing the said guide-plates together; and a link pivotally connected at one of its ends to one of said spokes and at the other of its ends to said guide-plates.

11. In a wheel, the combination with a hub member comprising a hub, spokes and a rim, the spokes provided at substantially their outer ends with laterally-projecting ears forming bearing-faces, of a cushioning device, comprising a resilient ring, engaged by the outer face of said rim, a tire member comprising a tire-rim, the inner periphery of which directly engages the said resilient ring, guide-plates secured to the said tire-rim and projecting inwardly over the said resilient ring and hub-rim, and engaging the laterally-projecting ears or bearing-faces of said spokes, and bolts, arranged within the hub-rim and between the said spokes, for securing the inner ends of the said guide-plates together; and a connection at one point only, between the said members, connecting the said members rotatively together.

12. In a wheel, the combination with a hub member comprising a hub, spokes and a rim, the spokes provided at substantially their outer ends with laterally-projecting ears forming bearing-faces, of a cushioning device, comprising a resilient ring, engaged by the outer face of said rim, a tire member comprising a tire-rim, the inner periphery of which directly engages the said resilient ring, guide-plates secured to the said tire-rim and projecting inwardly over the said resilient ring and hub-rim, and engaging the laterally-projecting ears or bearing-faces of said spokes, and bolts, arranged within the hub-rim and between the said spokes, for securing the inner ends of the said guide-plates together; and a link pivotally connected at one of its ends to said tire-member and at the other of its ends to said hub member.

13. In a wheel, the combination with a hub member comprising a hub, spokes and a rim, of a cushioning device, comprising a resilient ring, engaged by the outer face of said rim, the inner periphery of which directly engages the said resilient ring, and guide-plates extending inwardly from said tire-rim and engaging said hub member laterally, said guide-plates also having portions laterally projecting therefrom to engage said hub member radially upon a too extended movement of one member with respect to the other; and a link connecting the said members together.

14. In a wheel, the combination with a hub member comprising a hub, spokes and a rim, the spokes provided at substantially their outer ends with laterally-projecting ears forming bearing-faces, of a cushioning device, comprising a resilient ring, engaged by the outer face of said rim, a tire member comprising a tire-rim, the inner periphery of which directly engages the said resilient ring, and guide-plates secured to the said tire-rim and projecting inwardly over the said resilient ring and hub-rim, and engaging the laterally-projecting ears or bearing-faces of said spokes, said guide-plates also having portions laterally projecting therefrom to engage the radial edges of said hub-member ears or bearing-faces, upon a too extended movement of one member with respect to the other; and a link connecting the said members together, substantially as set forth.

15. In a wheel, the combination with a hub member comprising a hub, spokes and a rim, of a cushioning device, comprising a resilient ring, engaged by the outer face of said rim, a tire member comprising a tire-rim, the inner periphery of which directly engages the said resilient ring, guide-plates secured to the said tire-rim and extending inwardly over the said resilient ring and hub-rim, said guide-plates having spacing-pieces between them, and bolts, arranged within the hub-rim and between the said spokes, for securing the inner ends of the said guide-plates together; and a link connecting the said members together, substantially as set forth.

16. In a wheel, the combination with a hub member comprising a hub, spokes and a rim, of a cushioning device, comprising a resilient ring, engaged by the outer face of said rim, a tire member comprising a tire-rim, the inner periphery of which directly engages the said resilient ring, guide-plates secured to the said tire-rim and extending inwardly over the said resilient ring and hub-rim, said guide-plates having interlocking spacing-pieces extending laterally between them, and bolts, arranged within the hub-rim and between the said spokes, for securing the inner ends of the said guide-plates together; and a link connecting the said members together, substantially as set forth.

DANIEL HOWARD HAYWOOD.

Witnesses:
 C. F. CARRINGTON,
 M. M. CONOVER.